United States Patent [19]

Kuhnert

[11] 4,088,724
[45] May 9, 1978

[54] EXTERNAL SIZING AND COOLING OF EXTRUDED TUBULAR PROFILES OF THERMOPLASTIC MATERIAL

[75] Inventor: Johannes Kuhnert, Okriftel, Germany

[73] Assignee: Hoechst Aktiengesellschaft, Frankfurt am Main, Germany

[21] Appl. No.: 468,533

[22] Filed: May 9, 1974

[30] Foreign Application Priority Data

May 12, 1973 Germany .............................. 2324133

[51] Int. Cl.² ...................... B29D 23/04; B29C 25/00
[52] U.S. Cl. ....................................... 264/85; 264/28; 264/95; 264/209; 264/237; 425/72 R; 425/326.1
[58] Field of Search ...................... 264/95, 209, 99, 94, 264/98, 28, 85, 237; 425/72 R, 326 R

[56] References Cited

U.S. PATENT DOCUMENTS

| 3,065,501 | 11/1962 | Gasmire | 264/98 |
| 3,296,661 | 1/1967 | DeMoustier | 264/209 |
| 3,618,169 | 11/1971 | Coast | 264/95 |
| 3,810,725 | 5/1974 | Trub et al. | 264/95 |

FOREIGN PATENT DOCUMENTS

| 213,573 | 2/1957 | Australia | 264/209 |
| 1,123,318 | 8/1968 | United Kingdom. | |

Primary Examiner—James B. Lowe
Attorney, Agent, or Firm—Curtis, Morris & Safford

[57] ABSTRACT

After extrusion tubular profiles of thermoplastic material are sized and cooled by the overpressure method. The internal pressure is produced and cooling effected by evaporation in the hollow space of the profile of a chemically inert liquefied gas having a critical temperature in the range of from −150° to +35° C.

6 Claims, 3 Drawing Figures

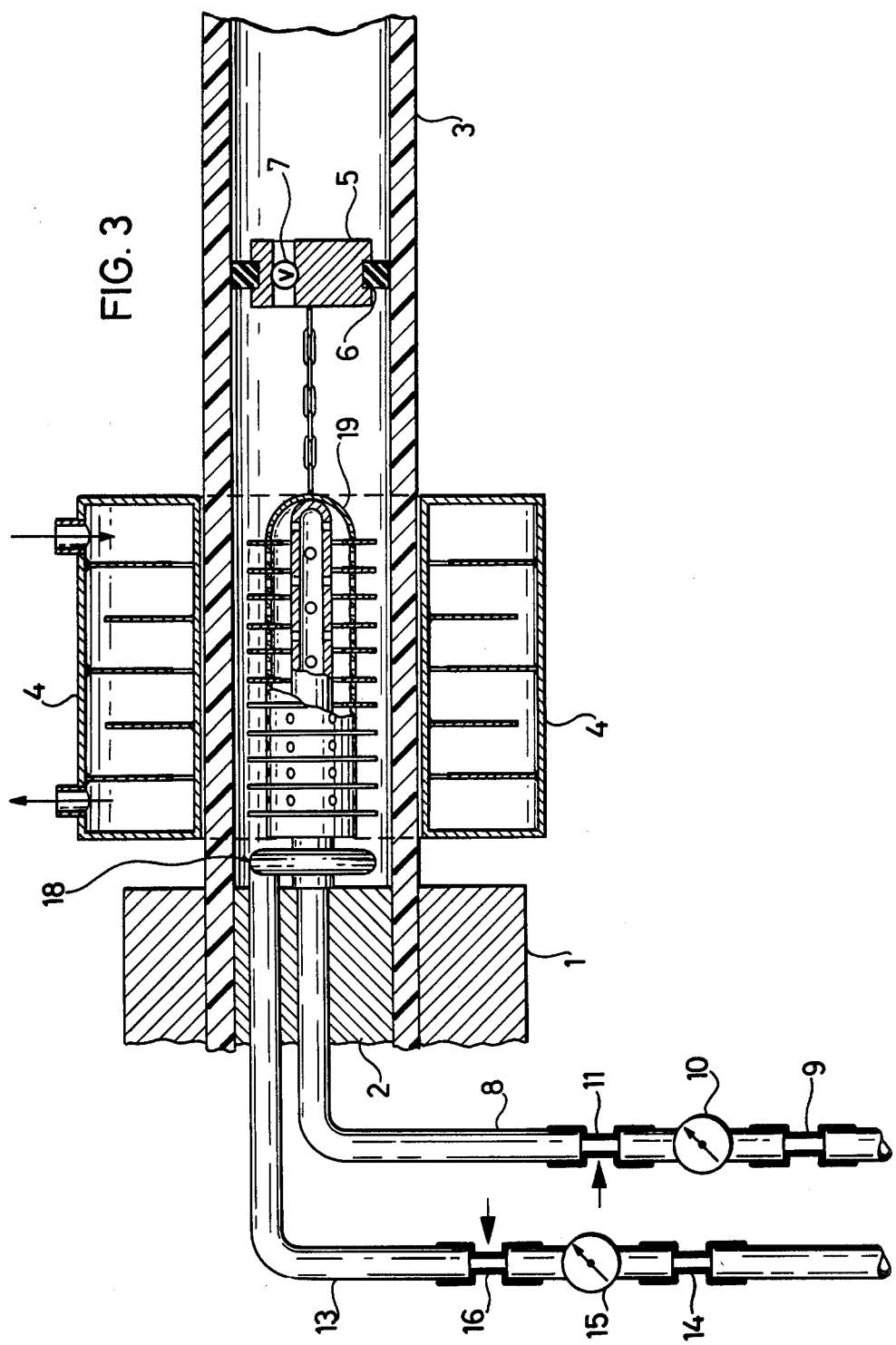

EXTERNAL SIZING AND COOLING OF EXTRUDED TUBULAR PROFILES OF THERMOPLASTIC MATERIAL

This invention relates to external sizing and cooling of extruded tubular profiles of thermoplastic material according to the overpressure method, especially of tubular profiles having large dimensions and thick walls.

The production of sized tubular profiles of thermoplastic material can be considered a three stage process, the first one comprising plastification of the granular or pulverulent material and extrusion of the homogeneous melt through a die, the second stage comprising the sizing of the cross section while drawing off and cooling and the third stage comprising aftercooling, winding or cutting into sections of the tubular profile. By sizing there is to be understood dimensioning of the extruded hollow profile to the desired cross section with predetermined dimensions and tolerances. On principle, external and internal sizing of tubular profiles is possible. External sizing can be effected by the overpressure method or by the vacuum method. In overpressure sizing air or another gas is fed under pressure through the mandrel of the die into the tubular profile closed at a certain distance from the die. To close the tubular profile a displaceable plug can be used which is fastened to the mandrel by means of a chain or a rod. The overpressure in the hollow space of the tubular profile presses the wall of the profile against the wall of the cooled sizing device. In said device the tubular profile passed through must be cooled by heat exchange to an extent such that the subsequent aftercooling and winding or cutting into sections can be effected without deformation.

Tubular profiles with thin walls are mostly sized externally by external cooling. With increasing wall thickness, i.e. with growing enthalpy of the extrudate per surface unit, it becomes more and more difficult to exchange the heat at a rate permitting an economical draw-off speed. Because of the wall friction increasing with the length of the sizing tool and the internal overpressure, the heat exchange over the sizing device is limited. Moreover, it is known that exclusive external cooling leads to undesired inherent tensions which grow with the wall thickness of the tubular profile. These inherent tensions may cause subsequent warpings or impair some strength properties. When oxygen-containing gases are used, the heat accumulation in the hollow space may give rise to a thermal-oxidative damage of the inner boundary layer of the profile, which, according to the laws of reaction kinetics, is the more rapid the higher the pressure and temperature. This oxidative damage impairs the quality. In the case of water pipes it may detrimentally affect the taste of drinking water. Hence, when thick walled tubular profiles are produced the same are also cooled at the inside. The liquid or gaseous coolant is likewise introduced through the mandrel of the moulding die into the tubular profile wherein it may be sprayed or atomized.

When a gaseous coolant is used for internal cooling the hollow profile is closed by a displaceable plug with an adjustable relief valve. With the aid of this valve the profile can be cooled internally with flowing gas and thereby an thermal-oxidative damage can be avoided. Owing to the fact that the specific heat capacity of gases, compared to that of molten plastic material, is very small, large amounts of cooling gas are required. Therefore, it has hitherto not been possible to produce in economic manner tubular profiles having large dimensions and thick walls with the exclusive use of gaseous coolants.

With the use of liquid coolants the internal cooling of extruded tubular profiles can be intensified. The cooling liquids are also introduced into the hollow space of the profile through the die mandrel and at a sufficient distance from the end of the hot die they are sprayed or atomized. To achieve as uniform a cooling as possible, the inner wall of the profile must be uniformly wetted by the cooling liquid over a sufficient distance. In external sizing this requires a suitable spraying system or the filling of the hollow space of the profile with cooling liquid. These measures involve certain difficulties in the overpressure method, for example in the case of profiles of large dimensions the proper weight of the coolant ballast, which may cause undesired deformations of the cross section of the tubular profile. For these reasons an economic production of tubular profiles having large dimensions and thick walls is also impeded when liquid coolants are used for internal cooling.

It is the object of the present invention to provide an improved process for external sizing and cooling extruded tubular profiles of thermoplastic material by the overpressure method.

It has been found that in external sizing and cooling of extruded tubular profiles of thermoplastic material by the overpressure method the aforesaid difficulties can be avoided when for producing the internal pressure and for cooling a chemically inert liquefied gas having a critical temperature of from −150° to 35° C is used, which gas is evaporated in the hollow space of the profile. It proved advantageous to cool with liquefied gas also the external sizing device.

Suitable gases are nitrogen, carbon dioxide, trichlorofluoromethane, difluorodichloromethane and other aliphatic halohydrocarbons. Comparative experiments have shown that best results can be obtained with liquid nitrogen (critical temperature −147.1° C, critical pressure 33.5 atmospheres).

The use of liquefied gas for cooling is known; it has already been proposed for the manufacture of tubular profiles and flexible tubing from thermoplastic material. It could not have been foreseen, however, that tubular profiles having large dimensions and thick walls can be produced in economic manner with the use of liquefied gas. Blown tubular profiles or hollow article are cooled in a closed tool, blowing and cooling being generally performed under a considerably higher overpressure. Moreover, when tubular profiles are blown the overpressure is completely released before the tool is opened. The experiences gained in this process cannot be transferred to a process in which the overpressure is limited by the wall friction with which the extrudate can be drawn through the sizing device open at both ends. The cooling problems in the extrusion of thin-walled tubular sheeting having a relatively low heat content per surface unit cannot be transferred either to the external sizing of tubular profiles having thick walls. As far as an external sizing device is used in the manufacture of tubular sheeting, this device is short so that no disturbing wall friction can occur.

It has been found that by the process of the invention simultaneously a plurality of important technical progresses can be obtained. By evaporation of the liquefied gas in the hollow space of the profile closed by the displaceable plug with relief valve, the required overpressure is produced. For the evaporation and heating of the inert gas heat is rapidly removed from the inner surface of the profile. Moreover, the inert gas prevents the wall from being damaged by oxidation and finally, the difficulties experienced with cooling liquids by their proper weight are avoided.

The liquefied gas is transferred from a cooled tank through an insulated piping to the mandrel and in the hollow space of the profile it is sprayed by a lance or several nozzles. In this manner it can be ensured that the inner surface of the profile is not wetted by the very cold liquid. The liquefied gas can be fed to the hollow space of the profile by the overpressure prevailing in the tank or by a dosing pump, the amount required being controlled by a measuring device. The external sizing device can be supplied and cooled with liquefied gas in like manner. The relief valve in the displaceable plug is adjusted in such a manner that in the hollow space of the profile an overpressure of about 0.4 to 0.8 atmosphere gauge is maintained. When liquid nitrogen is used for internal cooling of extruded tubes of large dimensions of high density polyethylene about 1 kg of nitrogen is required per kg of extrudate. The necessary amount of other liquefied gases can be estimated through the relation of the specific evaporation heat and the required amount of liquefied gas for other molten plastic materials with the aid of the known enthalpy diagrams.

To produce as large as possible a gas volume or to manufacture at low costs, compressed gas, for example air or an inert gas, can be used in addition to the liquefied gas, which compressed gas may be obtained from the liquefied gas by a ring circuit. The liquefied gas can be evaporated in a radiator mounted at the end of the extruder and possibly having a surface of a metal of high thermal conductivity enlarged by lamellae. Compressed gas can be blown externally on to the cooled radiator whereby it cools down. It is then mixed with evaporated gas passing out of the radiator into the hollow space of the tubular profile. The heat exchange between the cold gas mixture and the hot melt takes place exclusively by convection.

Another way to intensify the internal cooling consists in cooling segments fastened at the die mandrel and cooled with evaporating liquefied gas. The cooling surface of the segments, which should be made of a metal of high thermal conductivity, is elastically pressed against the inner surface of the profile. In this case the heat exchange, as in the external sizing device, takes place by heat conduction. The cooling segments can be constructed in such a manner that the cooling surface is pressed against the inner profile surface by the gas pressure of the evaporating liquefied gas before the gas passes into the hollow space of the profile where it brings about an additional cooling and produces the necessary internal pressure. In the interest of a low wall friction the cooling surface of the segments should be polished. To avoid marks the corners and edges of the cooling surfaces should be rounded or the cooling surfaces should be rounded or the cooling surfaces should have a slight convex shape. Care should be taken that the entire inner surface of the drawn off tubular profile is in contact with the cooling segments.

The three variants of the process of the invention are illustrated in FIGS. 1 to 3 of the accompanying drawings in which:

FIG. 3 illustrates the internal cooling by means of a radiator onto which compressed gas is blown from the outside.

Figure 1:
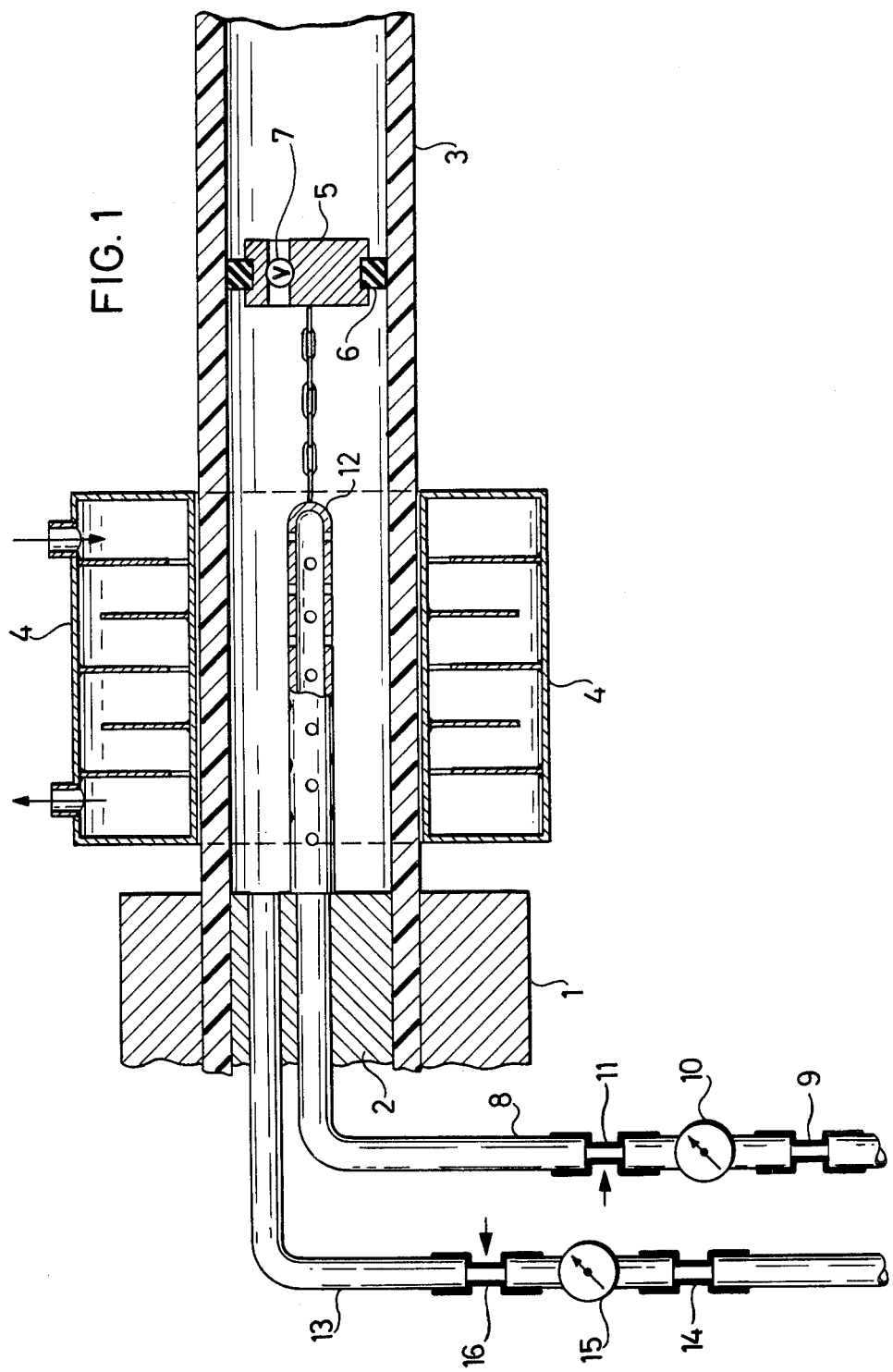
FIG. 1 illustrates the internal cooling by atomization of liquefied gas by a lance fastened at the mandrel of the die
Figure 2:
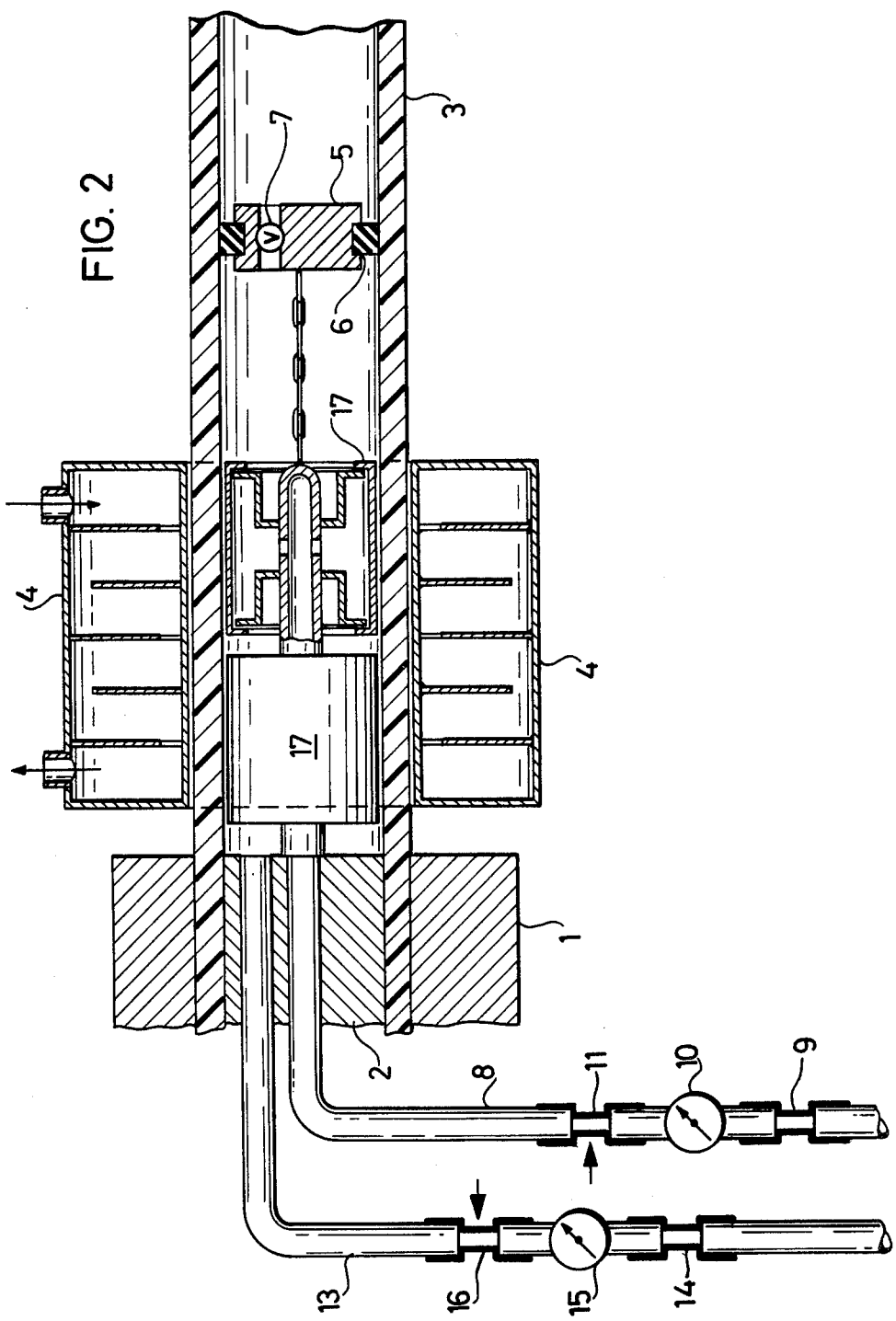
FIG. 2 illustrates the internal cooling with the aid of cooling segments the cooling surface of which is pressed against the inner surface of the tubular profile by the gas pressure.

In the drawings the numerals have the following meanings:

1 die of the molding tool
2 mandrel
3 extruded tubular profile which is taken off by a device not shown in the drawing and after-cooled in a cooling device likewise not shown
4 external sizing device with baffle plates for the coolant
5 displaceable plug which is fastened to the lance by means of a chain
6 sealing of the displaceable plug
7 relief valve for regulating the pressure in the hollow space of the profile before the plug
8 insulated conduit for the liquefied gas
9 valve for reducing the pressure of the liquefied gas
10 flow meter for the liquefied gas
11 adjustable throttle valve for the dosage of the liquefied gas
12 lance fastened at the mandrel and provided with spray nozzles and distributor channels
13 conduit for compressed gas
14 valve to reduce the pressure of the compressed gas
15 flow meter for the compressed gas
16 adjustable throttle valve for the dosage of the compressed gas
17 cooling segments with cooling surfaces which are pressed against the inner surface of the profile by the pressure of the gas escaping into the hollow space of the said profile
18 annular nozzle for the compressed gas and
19 radiator with distributor channels through which the evaporated liquefied gas can escape into the hollow space of the profile.

What is claimed is:

1. In the method of sizing and cooling thick walled extruded hollow tubular articles formed of a thermoplastic material by passing the tubular article through an elongated sizing device having inlet and outlet ends and an internal bore through which the article is passed that is generally complementary to the desired external configuration of the article; producing an internal pressure in said tubular article to urge the article against the internal bore of said sizing device, while simultaneously cooling the article as it passes through said sizing device, wherein the improvement comprises producing the internal pressure and cooling the article by spraying and evaporating, within the article, as it passes through said sizing device, a chemically inert liquefied gas having a critical temperature in the range of from −150° C to 35° C.

2. The process as defined in claim 1 wherein said chemically inert liquefied gas is selected from the group consisting of nitrogen, carbon dioxide, trichlorofluoromethane, difluorodichloromethane, and aliphatic halohydrocarbons.

3. The method as defined in claim 1 including the step of simultaneously cooling the exterior of said tubular article by passing liquefied gas through said sizing device.

4. The method as defined in claim 3 wherein said cooling step includes the step of locating radially movable cooling segment elements in said article; and said spraying step comprises spraying the liquefied gas under pressure within said segments to move the segments radially outwardly into contact with the inner wall of said article while simultaneously cooling said segments and the said article.

5. The method for sizing and cooling as defined in claim 1 wherein the internal pressure is produced in said article with evaporating liquefied gas and the simultaneous introduction into the article of a compressed gas.

6. The method for sizing and cooling as defined in claim 1 wherein said cooling step includes the step of locating a radiator heat exchange element in said article and said spraying step comprises spraying the liquefied gas within said radiator to evaporate therein and cool the radiator and passing the evaporated gas through the radiator to the space between the inner wall of the article and the radiator; and supplying compressed gas to said space for mixture with the evaporated gas therein, whereby cooling of said article is effected by convection.

* * * * *